April 17, 1962  W. J. SCOTT  3,030,121
CHUCK
Filed Nov. 12, 1958  2 Sheets-Sheet 1

INVENTOR.
William J. Scott,
BY Parker & Carter
Attorneys.

INVENTOR.
William J. Scott,
BY Parker & Carter
Attorneys.

United States Patent Office 3,030,121
Patented Apr. 17, 1962

3,030,121
CHUCK
William J. Scott, Sycamore, Ill., assignor, by mesne assignments, to Samuel J. Forbes, Cleveland, Ohio
Filed Nov. 12, 1958, Ser. No. 773,232
4 Claims. (Cl. 279—97)

This invention is in the field of drilling tools and is concerned more specifically with a chuck structure for use with a rotary and percussion drilling device, although many of the features of novelty are not restricted to any particular drilling assembly.

A primary object of the invention is a chuck structure that is self-tightening in use.

Another object is a chuck which will not back off and release its drill bit.

Another object is a chuck structure which provides a jam lock with its drill bit.

Another object is a chuck that provides a wedge lock between a locking ring and a locking key.

Another object is a chuck and rotary drill arrangement that can easily be unlocked if the chuck jams or sticks in use.

Another object is a chuck which is inexpensive to manufacture.

Another object is a chuck structure for a drilling device which will not mar or burr the shank of a drill bit.

Another object is a chuck which may be finger tightened.

Another object is a chucking arrangement which does not require any outside tools or implements to either lock or unlock it.

Another object is a chuck structure having a wedge type fit between a manually operable ring and key.

Another object is a rotary impact drill arrangement which automatically applies percussion blows to the chuck to loosen it and release the drill bit when rotated in the opposite direction from drilling.

Figure 1:
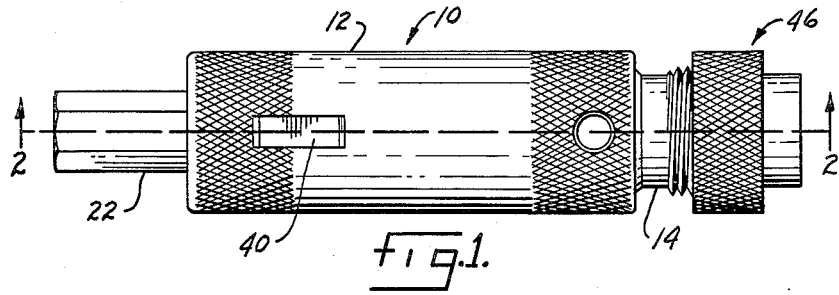
FIGURE 1 is a plan view of the tool.

In FIGURE 1, I have shown a rotary impact drill attachment or the like, designated generally 10, which may include an outer housing or barrel or sleeve 12 or the like shown in this case as generally cylindrical. A chuck 14 projects from the forward end of the housing and has a rear socket 16 which is screw threaded to accept the threaded end 18 of a shaft 20. The shaft projects out through the rear end of the housing and terminates in an enlarged internally threaded socket 22 or the like adapted to be attached to a standard electric drill. The enlargement may have a shoulder 24 which abuts a washer 26 or the like held in the rear end of the housing by rolling the edge of the housing over, as at 28. Or it might be held in any suitable manner.

A hammer element 30 disposed in the housing has a central bore 32 disposed around the shaft and is biased forwardly by a coil spring 34 or the like which extends into a countersink or socket 36 in the hammer and engages the forward shoulder 38 thereof. The rear end of the spring may engage the washer 26, as shown. A suitable key 40 or the like, depressed or otherwise formed in the housing or barrel, projects into a suitable longitudinal slot 42 in the hammer element so that while the hammer is allowed to slide axially on the shaft, it cannot be rotated relative to the barrel or housing.

Camming surfaces 44 are provided between the forward face of the hammer element 30 and the rear face of the chuck 14. Such camming surfaces are shown in detail in copending application Serial No. 709,382, filed January 16, 1958, now abandoned and will not be shown or described in detail herein. Such camming surfaces normally include right angle steps or shoulders spaced about 180 degrees apart so that when the shaft is rotated, the hammer element will be driven rearwardly compressing the spring 34 until matching shoulders on the hammer and chuck line up. At this point, the hammer element will be released and will be projected forward by the spring providing a percussion blow on the chuck. It is preferred that two such shoulders or steps be provided on the camming surfaces so that two hammer blows will be applied for every revolution of the shaft. But it might be more or less.

The structure so far described is shown more or less and described in copending application Serial No. 709,382, filed January 16, 1958, and for additional details, reference is made to that application.

A chuck structure, designated generally 46, is disposed on or built into the projecting forward end of the chuck so that the shank of a drill bit may be releasably received, locked, used and then released and removed.

Figure 2:
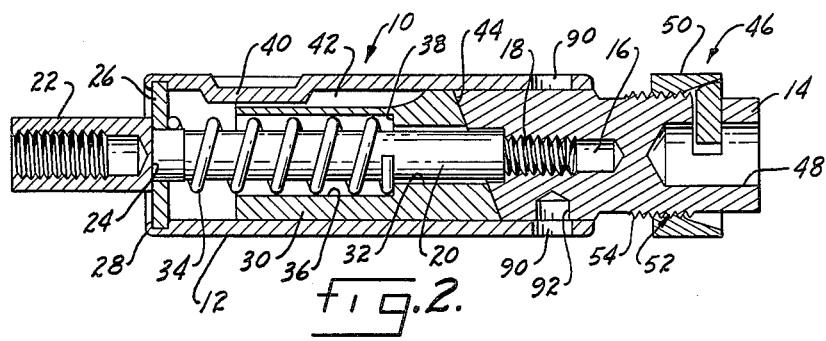
FIGURE 2 is an axial section of the FIGURE 1 tool.
Figures 3, 4:
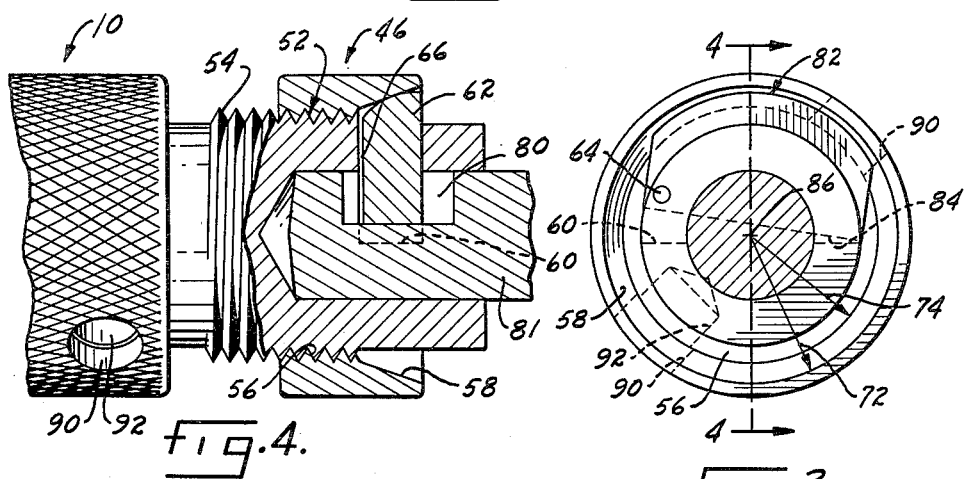
FIGURE 3 is an end view of FIGURE 2, on an enlarged scale.
FIGURE 4 is a section along line 4—4 of FIGURE 3.

As shown in detail in FIGURES 2, 3 and 4, the chuck has a generally centrally disposed bore 48 for receiving the shank of a drill bit. A locking ring 50 is screw threaded, as at 52, to the chuck. The chuck itself is provided with a threaded portion 54 which matches and meshes with a corresponding internal threaded portion 56 in the locking ring. It will be noted in FIGURE 4 that this internal threaded portion in the locking ring is disposed in the rear portion thereof and a camming surface 58 is disposed in the forward portion. This camming surface, which is generally frustoconical or the like, is peripherally continuous and opens or enlarges forwardly.

Just forward of the threaded portion in the chuck a lateral slot 60 is provided which intersects the axial bore 48. As will be noted in FIGURE 3, this lateral slot covers or extends over a substantial arcuate extent of the chuck and preferably may intersect slightly more than 180 degrees of the bore or socket 48. A key or key element 62, pivoted as at 64, is provided in the slot. It will be noted in FIGURE 4 that this key is not quite as wide as the slot so a slight clearance 66 may exist. I also prefer that the key be freely slidable on its pivot 64 or, if fixed on its pivot, the pivot should be slidable in the two sockets on each side. The point is that the key should slide axially so that it will move back and forth somewhat in the lateral slot due to the clearance indicated at 66.

Figures 5, 6:
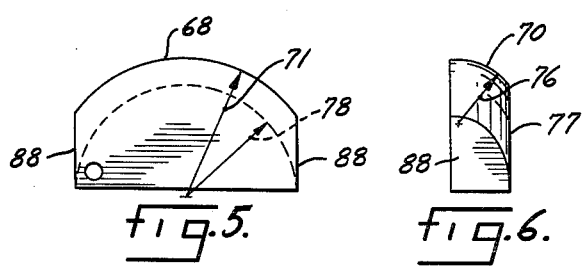
FIGURE 5 is a side view of the key.
FIGURE 6 is an end view of FIGURE 5.

As shown in FIGURE 5, the key has an outer arcuate surface 68 which is arcuate in a lateral direction, as shown in FIGURE 5, and also in an axial direction, as at 70 in FIGURE 6. The axially arcuate portion faces rearwardly toward the locking sleeve or ring and is constructed to be engaged by the camming surface 58 in the locking ring.

As will be noted in FIGURE 5, the lateral arc 68 on the outer surface of the key is struck on a radius which is slightly less than the radius at the outer or large end of the camming surface in the locking ring, this radius being designated generally 72 in FIGURE 3. However, the radius of the arc 68 of the key is slightly greater than the radius of the camming surface measured at its inner or small end, as designated at 74 in FIGURE 3. The axial radius, designated generally 76 in FIGURE 6 describing the arcuate surface 70 of the key, is such that the rear surface 77 of the key will be struck on an arc which has a radius designated generally 78 in FIGURE 5 that is less than the small radius 74 of the camming surface 58 in the locking ring.

By this relationship, and as will be noticed in FIGURE 4, the camming surface will engage the arcuate or well rounded rear shoulder of the key when the locking ring is screwed forwardly so that the key will be forced tightly down into the locking notch 80 normally found in the shank of a drill bit 81. The location of the pivot 64 for the key is such that point contact, as at 82 in FIGURE 3, will be acquired between the camming surface and the rounded outer surface of the key. It will be noted that this point or contact 82 will be disposed generally at right angles to the lower or locking surface 84 of the key on a line passing through the axis or center 86 of the bore or socket 48 of the chuck.

Additionally, both sides of the key may be chopped off or flattened, as at 88 in FIGURE 5, so that when the key is pivoted to its fully open position, no interference or binding with the sides or bottom of the slot will occur.

It is important that the screw threads between the chuck and locking ring be left-hand or opposite to the normal direction of drilling. Normally, drills rotate in a clockwise direction during drilling. With the threads between the chuck and locking ring left-handed, the ring must be rotated counterclockwise to walk it forward and lock the key against the drill bit. Unlocking would require clockwise rotation of the locking ring which will walk it rearwardly. The point is that by having left-hand threads, during drilling the chuck will be rotated clockwise and the centrifugal forces exerted on the key ring and the rest of the parts will be such that the chuck assembly will have a self-tightening effect or tendency. If the threads were right-hand threads the reactive forces would produce an unlocking tendency or effect, which is not desirable.

On occasion, the type of service of the unit will cause the ring to be so tightly wedged against the key that it cannot be backed off manually. The chuck will merely rotate with the ring and the hammer will be driven rearwardly applying a series of percussion blows to the chuck. These percussion blows normally are sufficient to loosen the jam or wedge lock between the ring and key. In short, the operator may hold the housing or barrel 12 in one hand and rotate the ring 50 with the other in its unlocking direction. Initially, the ring, key and chuck will be jammed together so that the chuck wil rotate with the ring. Rotation of these three locked or stuck parts will be clockwise due to the left-hand nature of the threads since this is the unlocking direction. The hammer 30 will be forced rearwardly and will apply one or more or a series of percussion blows to the chuck. These percussion blows are normally sufficient to jar loose the wedge fit or "stick" between the chuck, key and ring. In this sense, the over-all device has a tendency to unlock itself and to automatically break a tight jam between the chuck, key and ring.

But if the wedge fit or jam is too tight and the hammer blows do not have effect, I provide openings, as at 90, which may be drilled otherwise through the barrel or housing. I prefer that these openings be 180 degrees apart so that they may be drilled in one operation, but this is not absolutely necessary. A suitable socket 92 or the like is provided in the inner portion of the chuck in the housing. This socket is aligned with the lateral openings 90. When the cam 30 is in its fully forward position, the socket 92 should be aligned wtih one of the openings 90. In this position, the end of an instrument, for example a screw driver or the like, may be struck through one of the openings 90 into the socket 92 and this will interlock the chuck and housing. Then one hand of the operator may grasp the housing and the other may turn the ring 50 to break the interlock or jam. Or a suitable wrench may be put around the ring to gain additional leverage.

In the arrangement shown, having the two openings 90 in the housing 180 degrees apart with the one socket 92 in the chuck is of decided advantage since the two openings 90 may be drilled in one operation and the socket 92 only requires one more drilling step. Since two shoulders or steps and two cam surfaces leading up to these shoulders in the camming surfaces 44 are provided between the hammer and chuck, the arrangement is such that in either position, the socket 92 will be aligned with either one of the openings 90 or the other. I have referred to the use of a screw driver to interlock the housing or barrel and chuck, but the shank of another drill bit might be used. Since the stationary or normal rotary position of the chuck will be when the hammer is fully forward, the openings 90 and socket 92 should be made to line up at these points.

Figure 7:
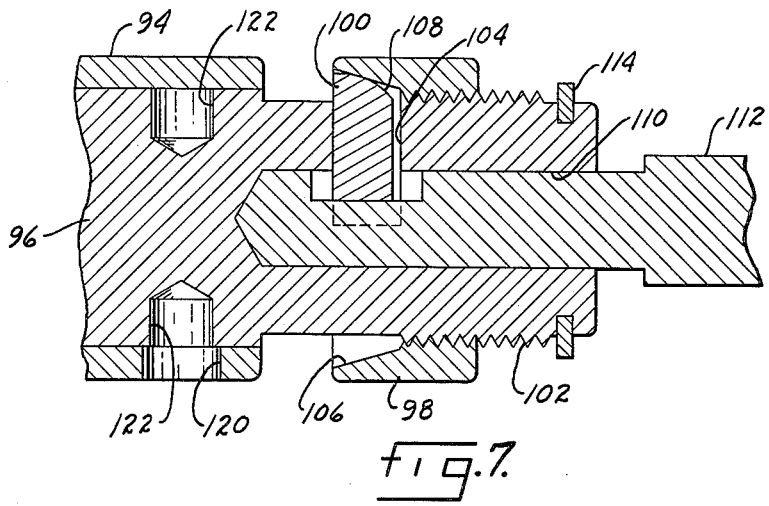
FIGURE 7 is an axial section, similar to FIGURE 4.
Figures 8, 9:
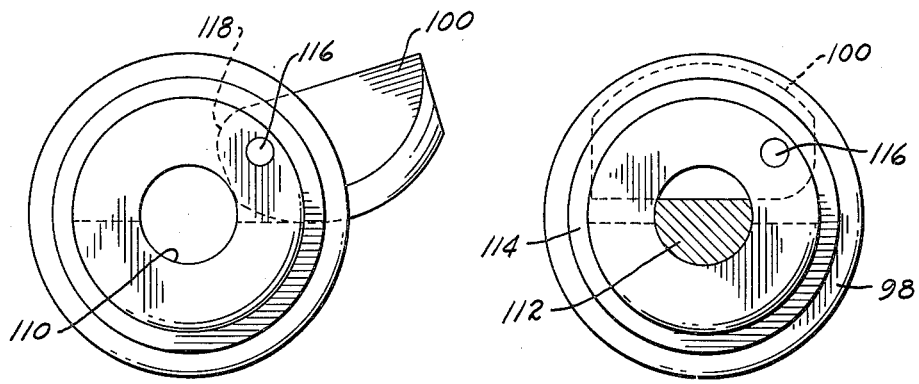
FIGURE 8 is an end view of the FIGURE 7 modification with the key open.
FIGURE 9 is a similar to FIGURE 8 but with the key closed.

In FIGURES 7 through 9, I have shown a modification in which the barrel or housing is indicated at 94, the chuck at 96, the locking ring at 98 and the key at 100. It will be noted that the threads 102 on the chuck are forward of the slot 104 and the camming surface 106 faces or opens rearwardly. The key 100 has also been turned around so that the arcuate shoulder or engaging surface 108 faces in the opposite direction. In this case, the bore or socket 110 in the chuck is somewhat longer or deeper and the shank 112 of the drill bit should be longer. The threads between the locking ring and chuck are right-handed and the sleeve is rotated counterclockwise to move it rearwardly to lock the key in place. To prevent the locking ring from being turned off of the end of the chuck, a snap ring 114 or the like may be disposed on the forward end of the chuck.

As shown in FIGURES 8 and 9, the key 100 is swung on a pivot 116 which is located on the other side, as compared to the FIGURE 5 form. In the form shown, the inner edge or corner of the key, as at 118, may be rounded and the pivot 116 is moved somewhat farther into the body of the key. It should be understood that either key structure may be used in either form, but it is preferred that the key be swung on the left, as in FIGURE 3, when using left-hand threads, and on the right, as in FIGURE 8, when using right-hand threads.

When using right-hand threads, as in FIGURE 7, the threads and locking ring are forward of the slot and the camming surface faces rearwardly to engage and lock the key. But, as in the previous form, the centrifugal force and hammer or percussion effect will tend to tighten the chuck.

In FIGURE 7, one hole 120 is provided in the barrel or housing and two sockets 122, 180 degrees apart, are provided in the chuck, which is the opposite of the arrangement shown in FIGURE 2. But it may be either way in either modification.

The use, operation and function of my invention are as follows:

The invention is concerned with a chucking arrangement for holding the shank of a conventional drill bit in a drilling attachment or a drilling arrangement, and although many of the features have been described in connection with what I may refer to as a drilling attachment, which is adapted to be attached to a standard electric drill, nevertheless, many of the features are adaptable or usable with a standard drill, regardless of whether the over-all assembly is to be used merely for drilling or for a combination of drilling and impacting or percussion. For example, the chuck alone including the threaded outer surface and the threaded ring meshing with that surface and the key and socket arrangement might be used on a conventional drill, regardless of whether hammer blows take place or not.

On the other hand, the over-all combination has decided advantage in a combination drilling and impacting device since the percussion blows of such an arrangement are hard on normal chucks, and the specific structure shown is particularly constructed to stand up under severe operating conditions in which percussion blows are applied to a drill bit.

The broad engagement between the slot in the rear end or shank of the bit and the key is important since the percussive blows and torque will be distributed over a wide area. If limited contact is provided, such as by a set screw, the shank of the drill bit will normally become burred and it may be very difficult to remove the bit from the tool.

One important aspect of the invention is that the chuck may be fully tightened or loosened with finger pressure only. For best operation, the camming surface should diverge or have an included angle of from 20 to 40 degrees. And no separate tools, such as wrenches, keys, etc. are required or necessary. But if a jam occurs, it can be easily broken.

An additional advantage is that if the key, chuck and ring should become temporarily wedged in use, counter rotation of the parts, as described hereinabove, will apply percussion blows to the chuck which will have a tendency to loosen or break the wedged condition.

Since the key floats on its pivot, it will be pushed forward by the locking ring and will be flush against the forward and bottom surfaces of the slot. Thus, no binding moments will be set up in the pivot.

The unlocking arrangement, including the holes drilled or otherwise provided through the housing or barrel and the matching socket in the chuck, while simple, provides a positive means for breaking any tightly wedged situation in the chuck. The outer surfaces of the housing and locking ring have been shown as knurled to facilitate gripping, and any suitable configuration or pattern may be used.

The chuck has the advantage that all of the parts are simple. For example, the outer surface of the key may be made on any conventional turning equipment, such as a lathe, and special machining or grinding is not necessarily required. The slot across the chuck for accepting the key may be quite easily and simply milled. The threads between the chuck and locking ring are easy and inexpensive to provide.

While I have shown and described the preferred form of my invention, it should be understood that suitable additional modifications, changes, substitutions, alterations and variations may be applied or used. And I do not wish to be restricted to the specific structure shown. With the above variations and changes in mind, it is wished that the invention be unrestricted, except as by the appended claims.

I claim:

1. In a chuck structure, a chuck having a generally central bore for receiving the shank of a drill bit, a lateral slot across the chuck intersecting the bore over a substantial peripheral extent, a key in the slot on an axially disposed pivot and having an arcuate outer surface projecting above the slot when the key is fully closed, said key having a flat side extending in a chordal relationship across said central bore when said key is fully closed, and a locking ring threaded on the chuck and constructed to move axially in response to rotation thereof so as to engage and lock the key or to axially clear the key so as to release it.

2. The structure of claim 1 further characterized by and including a peripheral somewhat conical camming surface inside the ring constructed to engage the outer surface of the key, and a coacting camming contour on the outer surface of the key to be engaged by the camming surface in the ring.

3. The structure of claim 2 further characterized in that the key is slidably mounted on an axially disposed pivot, the width of the key being slightly less than the axial dimension of the slot so that the key may slide somewhat when engaged by the ring.

4. The structure of claim 1 further characterized in that the threads between the chuck and ring are of such a hand that in response to rotation of the chuck, the ring and key will be self-tightening.

References Cited in the file of this patent
UNITED STATES PATENTS

| | | |
|---|---|---|
| 403,083 | Andrew | May 14, 1889 |
| 646,489 | Cook | Apr. 3, 1900 |
| 1,433,527 | Browand | Oct. 31, 1922 |
| 2,231,252 | Chesterman | Feb. 11, 1941 |
| 2,667,357 | Andreasson | Jan. 26, 1954 |
| 2,894,759 | De Bruin | July 14, 1959 |

FOREIGN PATENTS

| | | |
|---|---|---|
| 15,717 | Great Britain | July 5, 1912 |